(12) United States Patent
Kishor et al.

(10) Patent No.: US 9,278,815 B2
(45) Date of Patent: Mar. 8, 2016

(54) BELT SCRAPER ASSEMBLY

(71) Applicant: TEGA INDUSTRIES LIMITED, Kolkata, West Bengal (IN)

(72) Inventors: Kaushal Kishor, West Bengal (IN); Saroj Kumar Roy, West Bengal (IN); Imam Syed Yaver, West Bengal (IN); Arunlal Panigrahi, West Bengal (IN)

(73) Assignee: TEGA Industries Limited, Kolkata (IN)

( * ) Notice: Subject to any disclaimer, the term of this patent is extended or adjusted under 35 U.S.C. 154(b) by 0 days.

(21) Appl. No.: 14/407,732

(22) PCT Filed: Apr. 19, 2013

(86) PCT No.: PCT/IN2013/000260
§ 371 (c)(1),
(2) Date: Dec. 12, 2014

(87) PCT Pub. No.: WO2014/002112
PCT Pub. Date: Jan. 3, 2014

(65) Prior Publication Data
US 2015/0151924 A1   Jun. 4, 2015

(30) Foreign Application Priority Data

Jun. 26, 2012  (IN) .............................. 695/KOL/2012

(51) Int. Cl.
*B65G 45/12* (2006.01)
*B65G 45/16* (2006.01)
*B65G 45/24* (2006.01)

(52) U.S. Cl.
CPC ....................... *B65G 45/16* (2013.01)

(58) Field of Classification Search
CPC .......... B65G 45/12; B65G 45/16; B65G 45/24
USPC .......................................... 198/497, 498, 499
See application file for complete search history.

(56) References Cited

U.S. PATENT DOCUMENTS

| | | | | |
|---|---|---|---|---|
| 4,352,425 A | * | 10/1982 | Childress et al. | 198/499 |
| 4,428,090 A | * | 1/1984 | Coggin et al. | 15/93.4 |
| 4,703,845 A | * | 11/1987 | Veenhof | 198/499 |
| 4,754,868 A | * | 7/1988 | Hughes et al. | 198/499 |
| 5,011,002 A | * | 4/1991 | Gibbs | 198/497 |
| 5,222,588 A | * | 6/1993 | Gordon | 198/499 |
| 5,975,281 A | * | 11/1999 | Yoshizako et al. | 198/499 |
| 6,152,290 A | * | 11/2000 | Mott et al. | 198/499 |
| 6,633,739 B2 | * | 10/2003 | White et al. | 399/353 |

(Continued)

FOREIGN PATENT DOCUMENTS

EP   0090985 A1   10/1983

OTHER PUBLICATIONS

International Search Report issued in PCT/IN2013/000260 mailed Aug. 5, 2013 (2 pages).

*Primary Examiner* — Douglas Hess
(74) *Attorney, Agent, or Firm* — Locke Lord LLP; Scott D. Wofsy; Christopher J. Cillié

(57) ABSTRACT

An improved belt scraper assembly for belt conveyors includes a blade assembly and a hinge assembly mounted on either side of a supporting flexible member for facilitating twin blade cleaning. The blade assembly is operatively connected to the hinge assembly which is adapted to ensure limited rotational motion of the blade assembly.

10 Claims, 6 Drawing Sheets

(56) References Cited

U.S. PATENT DOCUMENTS

| | | | |
|---|---|---|---|
| 6,681,919 B1* | 1/2004 | Brink | 198/499 |
| 6,749,725 B1* | 6/2004 | Isometsa et al. | 162/281 |
| 6,820,734 B1* | 11/2004 | Gilbert et al. | 198/499 |
| 6,843,363 B2* | 1/2005 | Schwarze | 198/497 |
| 6,948,609 B2* | 9/2005 | Finger et al. | 198/499 |
| 7,793,418 B2* | 9/2010 | Van Norman et al. | 29/890.03 |
| 8,662,282 B1* | 3/2014 | Withington et al. | 198/494 |
| 2009/0272625 A1* | 11/2009 | Devries et al. | |
| 2011/0100782 A1 | 5/2011 | Dunnwald | |
| 2014/0262688 A1* | 9/2014 | Brunone | |

\* cited by examiner

BELT SCRAPER ASSEMBLY

CROSS REFERENCE TO RELATED APPLICATIONS

This application is a national stage entry of PCT/IN2013/000260, filed on Apr. 19, 2013, which claims priority from Indian Application No. 695/KOL/2012, filed on Jun. 26, 2012.

FIELD OF THE INVENTION

The present invention in general relates to belt scrapers for its application in bulk material handling belt conveyors and in particular, to an improved belt scraper assembly with an improved arrangement of at least one blade assembly connected to at least an hinge assembly on either side of a flexible member.

BACKGROUND OF THE INVENTION

In mining industry, conveyor belts are used to receive, transport, and deliver mined substances from one location to another for further processing or unloading.

During the process, particles frequently accumulate on the conveyor belt surface. Without the removal of the particles, the conveyor belt may become inoperative.

So, belt scrapers are used in bulk material handling belt conveyors to avoid material carry back, reduce spillage and keep belt clean. Clean belts help prevent material build up on snub pulley and return idlers and increase its life, thereby reducing cleaning cost, downtime cost and mis-tracking of the belt.

In first generation Counter weight belt scraper, single blade design is made from thick rubber strip (wider than belt width) under the return belt and the counter weight provided at the side of the belt scraper with a pivot point to provide contact with the belt. The initial load exerted to the belt is approximately 80-90 Kgs. With time when the cleaning effectiveness reduces, the weight is increased and it can go up to 150 Kgs.

Cleaning efficiency is approx 60-68% and always, it is needed to increase counter weight load on a regular basis against blade wear. It is very less effective and high maintenance is involved.

Second generation fixed mount belt scraper's segmented blades are made of hard alloy steel with rubber cushion at the bottom of blade mounted on a steel tube with both end fixed mount. It does not have automatic adjustments against blade wear. It provides inconsistent contact pressure to the belt which is approximately 100-125 Kgs.

Cleaning efficiency is approx 70-85% and always, there is need to lift-up of the fixed mount on a regular basis against blade wear. It is less effective and high maintenance involved.

Pneumatically operated third generation belt scraper having segmented blades are made of hard alloy steel with or without polymer cushion at the bottom mounted of blade on a steel tube with ratchet and pinion mount and adjustment done through compressed air at 7-10 bars pneumatically. They provide inconsistent load to the belt of approximately 90-110 Kgs.

Cleaning efficiency is approx 75-85%. There is a need to pump air periodically to maintain the blade to belt contact due to drop in air pressure/leakage/chocking of air. Maintenance requirement is high.

In fourth generation belt scrapers with shock absorbers semi automatic adjustments are present to some extent but, but there is a need for periodic manual adjustments against blade wear every 3-4 weeks interval. This type of belt scrapers have segmented type metallic blades with pivot point below the scraping edge mounted on a steel tube with both ends rubber shock absorber. It provides comparatively less load to the belt, which is approximately 24-80 Kgs.

Cleaning efficiency is approx 92-95%. It provides less consistency against heavy duty, high speed, vibration and bi-directional belt operation.

In general, the belt scraper assemblies were not sacrosanct and had one problem or the other, in operation and were not sacrosanct.

Accordingly there is a long felt need to design a sacrosanct belt scraper assembly which ensures two layers of belt cleaning using a single member to carry the blades, eliminates misalignment of blades, ensures automatic adjustment of the blades, ensures, lesser wearing rate and no material build up, ensures size and reduction, easy installation, is suitable for various belt speeds and reduce maintenance costs, suitable for various material and in corrosive environment and ensures easy joining of sub assemblies.

The present invention meets the aforesaid long felt need.

All through out the specification including the claims, the words "conveyor belt", "scraper blade" "scraper holding arm", "spring", "washer", "stud", "blade", "blade tip", "blade tip assembly", "spring", "hinge assembly", "lock", "key", "chain" and "nut" are to be interpreted in the broadest sense of the respective terms and includes all similar items in the field known by other terms, as may be clear to persons skilled in the art. Restriction/limitation, if any, referred to in the specification, is solely by way of example and understanding the present invention.

OBJECTS OF THE INVENTION

It is the principal object of the present invention to provide an improved belt scraper assembly for belt conveyors which ensures two layers of belt cleaning using a single member to carry the blades, eliminates misalignment of blades, ensures automatic adjustment of the blades and ensures lesser wearing rate and no material build up.

It is a further object of the present invention to provide an improved belt scraper assembly for belt conveyors which ensures size and weight reduction and easy installation.

It is another object of the present invention to provide an improved belt scrapper assembly for belt conveyor which is suitable for various belt speeds and reduce maintenance costs.

It is yet another object of the present invention to provide an improved belt scrapper assembly for belt conveyor which is suitable for various materials and is suitable for working in corrosive environment.

It is a further object of the present invention to provide an improved belt scraper assembly for belt conveyors which is suitable to be used up to 200° C.

It is a further object of the present invention to provide an improved belt scraper assembly for belt conveyors which ensures easy joining of the subassemblies.

It is another object of the present invention is to provide an improved belt scraper assembly for belt conveyors which have substantially high cleaning efficiency by way of twin blade cleaning.

How the foregoing objects are achieved and other aspects of the present invention, will be clear from the following description which is purely by way of understanding and not by way of any sort of limitation.

SUMMARY OF THE INVENTION

Accordingly, the present invention provides an improved belt scraper assembly for belt conveyors comprising at least a blade assembly and at least a hinge assembly mounted on either side of a supporting flexible member for facilitating twin blade cleaning, said blade assembly being operatively connected to said hinge assembly which is adapted to ensure limited rotational motion of said blade assembly.

In accordance with preferred embodiments of the belt scraper assembly of the present invention:

said blade assembly is a blade tip assembly comprising a tungsten carbide flexible tip directly contacted with the belt surface and brazed on a plate of mild steel, the latter having drilled holes on its surface and said flexible member is a chain or a wire;

said hinge assembly comprises two mild steel plates connected by a pin, said plates being provided with drilled holes on its surface;

said blade tip assembly is attached to said steel plate by bolting in the drilled holes with the corresponding drilled holes;

said hinge assembly is provided with torsion springs for providing flipping motion to said blade assembly and said hinge assembly having mild steel plates, varies in length for adjacent blades, so that said flexible member (3) forms a curve;

said steel plate of said hinge assembly is connected to a portion along its base, said portion being of adjustable dimension and having a cubical portion and a cylindrical portion with a tapped hole;

said steel plate (14) is connected to said cubical portion (18) by bolting the respective flat portions;

said cylindrical portion is attached to a locking unit along its base, by bolting through said tapped hole and through a hole in the top surface of said locking unit;

said locking unit has a locking portion which locks a key along said hole to provide limited motion to said blade tip assembly;

said locking unit is connected along its front wall to a plate member by bolting through holes in said front wall of said locking unit and through corresponding holes in the corresponding end wall of said plate member, said plate member being connected to said flexible member.

BRIEF DESCRIPTION OF THE ACCOMPANYING DRAWINGS

The nature and scope of the present invention will be better understood from the accompanying drawings, which are by way of illustration of a preferred embodiment and not by way of any sort of limitation. In the accompanying drawings, FIGS. 1a, 1b and 1c illustrate top view, back view and the isometric view respectively of a preferred embodiment of the improved belt scraper assembly in accordance with a preferred embodiment of the present invention.

FIG. 2a is the top view of the hinge assembly shown in FIG. 1a.

FIG. 2b is the isometric view of blade tip assembly shown in FIG. 1a.

FIG. 4a is an isometric view of plate member 6 shown in FIG. 1a.

FIGS. 4b and 4c are the top view and front view respectively of the locking unit shown in FIG. 1a.

FIG. 5 is a flat isometric view of the portion marked 4 in FIG. 1a.

DETAILED DESCRIPTION OF THE INVENTION

Figure 1A:
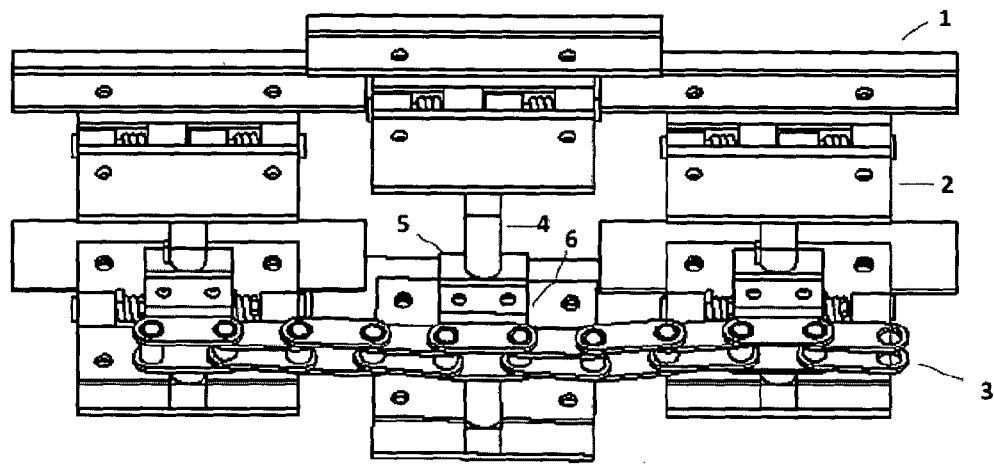

The following describes a preferred embodiment of the present invention, which is purely for the sake of understanding the performance of the invention, and not by way of any sort of limitation.

Desired Objectives of the Belt Scraper Assembly According to the Present Invention:

| a. | Eliminate misalignment of blades and ensures two layers of belt cleaning using a single member to carry the blades | b. | Reduce maintenance cost |
| c. | Automatic adjustment of the blades | d. | Suitable for various belt speeds |
| e. | Less blade wear rate | f. | Suitable for various material |
| g. | No material buildup | h. | Suitable to be used up to 200° C. |
| i. | Size reduction | j. | Suitable to be used in the corrosive environment |
| k. | Weight Reduction | l. | Twin blade cleaning |
| m. | Easy installation | | |

Many developments in the design of the scraper have been carried out. All of them individually solve certain problems but none of them meets the above objectives in a sacrosanct manner. There is always some problem or the other.

The present invention brings all the above changes in a way never been done before. The blade elements in the present invention are carried on a flexible member such as but not limited to a wire or a chain, to keep the blades in contact with the belt throughout. The same flexible member supports at least two series of blades aligned on both the sides to provide twin blade cleaning. Moreover, all the blades have a flexible tip member which cleans the belt in normal condition but bends when it encounters a mechanical fastener or similar.

For understanding the invention better, reference will now be made to the following preferred embodiment of the invention, which is illustrated in the accompanying drawings.

In the figures like reference numerals represent like features.

Turning first to FIG. 1a, there is illustrated the blade scraper assembly of three blade holder assembly pairs (1, 2) connected to either side of a flexible chain (3). The FIG. 1a shows three such pairs (1, 2) on either side of the chain (3). There can be more. Minimum there should be one pair, i.e. one each of a blade tip assembly (1) and a hinge assembly (2) on either side of the chain (3).

Since, there are at least two such blade assemblies connected to both the sides of the flexible member such as chain, this arrangement provides two layers of belt cleaning using a single member to carry the blades. This was hitherto not achieved.

Figure 1B:
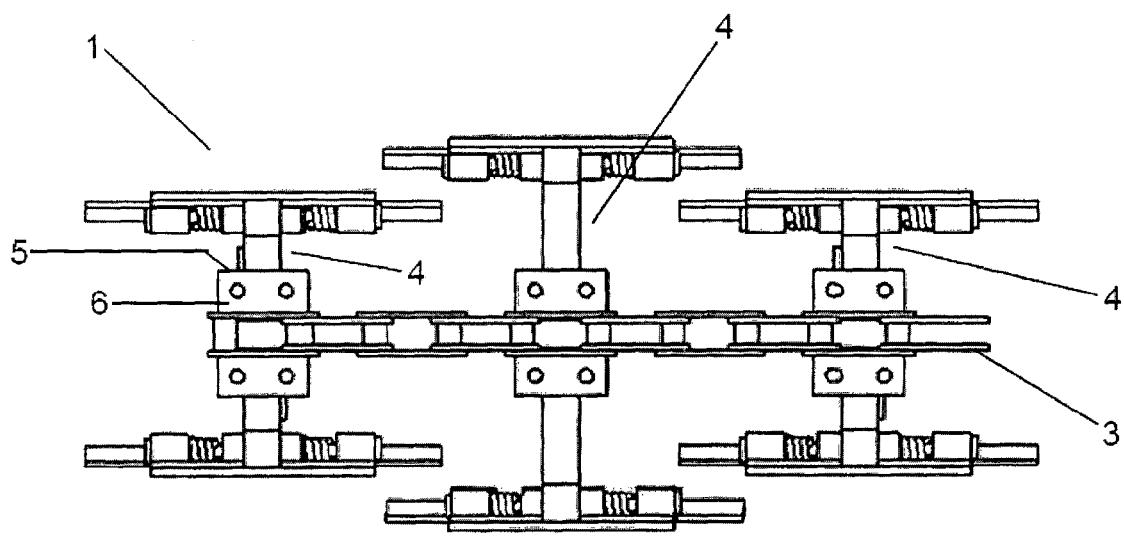
Figure 1C:
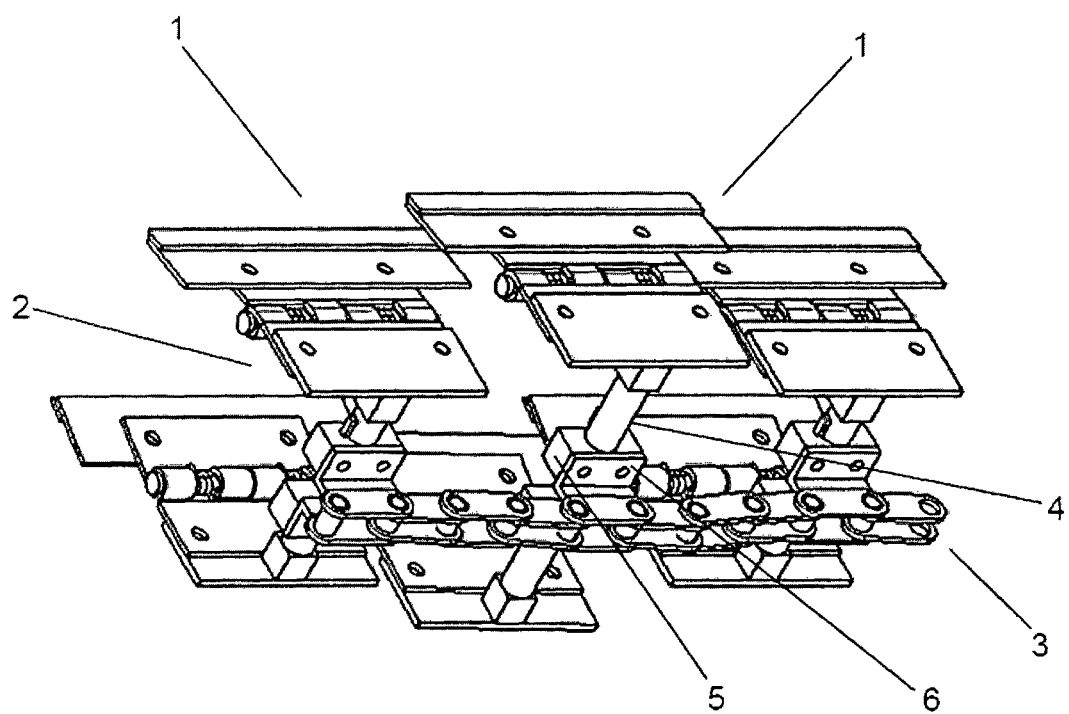

The FIG. 1b shows a back view of the assembly, while FIG. 1c being an isometric view thereof shows in greater detail the disposition of the elements of the assembly. It shows that the belt scrapper assembly has at least a blade tip assembly (1) connected to the hinge assembly (2) on either side of chain (3). The hinge assembly has a portion (4) connected to lower portion of its base. This portion in turn along its basal part is connected to a top portion of a locking unit (5). The locking unit (5) is connected along its front wall to a plate portion (6) along the end wall of the latter. This plate portion is connected to the chain (3).

The arrangement as stated in the preceding paragraph enables achieving all the objects of the present invention. How this is done is now explained with reference to the subsequent figures.

Figure 2A:
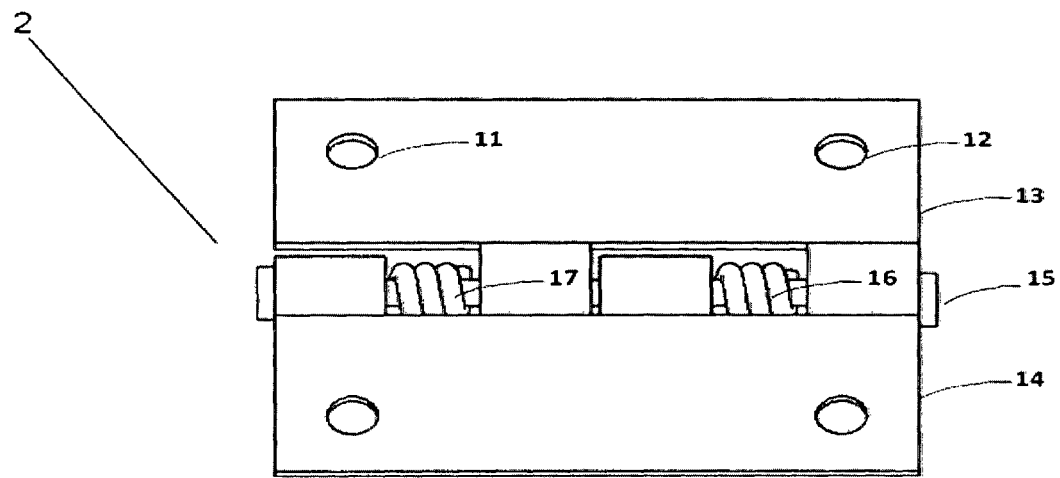
Figure 2B:
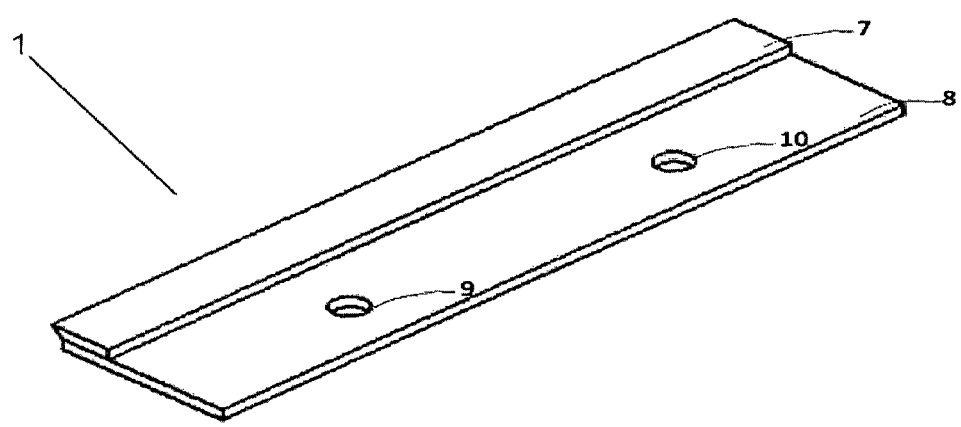

The blade tip assembly (1) is shown in detail in FIG. 2b, which directly comes in contact with the belt surface. It consists of a tungsten carbide tip (7) brazed on a plate of mild steel (8). There are at least two drilled holes (9, 10) on the surface of the mild steel plate (8). The flexible tip (7) cleans the belt in normal condition but bends when it encounters a mechanical fastener or similar.

The hinge assembly (2) is shown in detail in FIG. 2a. The hinge assembly consists of two mild steel plates (13) and (14), connected by a pin (15). There is also a provision of two torsion springs (16) and (17), in the hinge assembly (2) to provide flipping motion to the blade tip assembly (1). The hinge assembly has two holes (11,12) on its surface as shown in FIG. 2a.

The blade tip assembly (1) is connected with the plate (13) of hinge assembly (2) by bolting in the drilled holes (9) with (11) and (10) with (12).

The adjacent blade assembly pairs vary in height by varying the dimension of the portion (4). This is important so that the flipping of an individual blade holder do not interact with the adjacent blade holder. For that purpose, the height of the adjacent blade assembly pairs is varied, so as to have a gap there between. This should be adequately clear from FIG. 1b in particular.

Further, from FIG. 1a, it would be clear that that the unit (2) having mild steel plates (13, 14) varies in length for the adjacent blades, so that the chain forms a curve, which is important to generate the normal force against the belt surface.

Figure 3A:
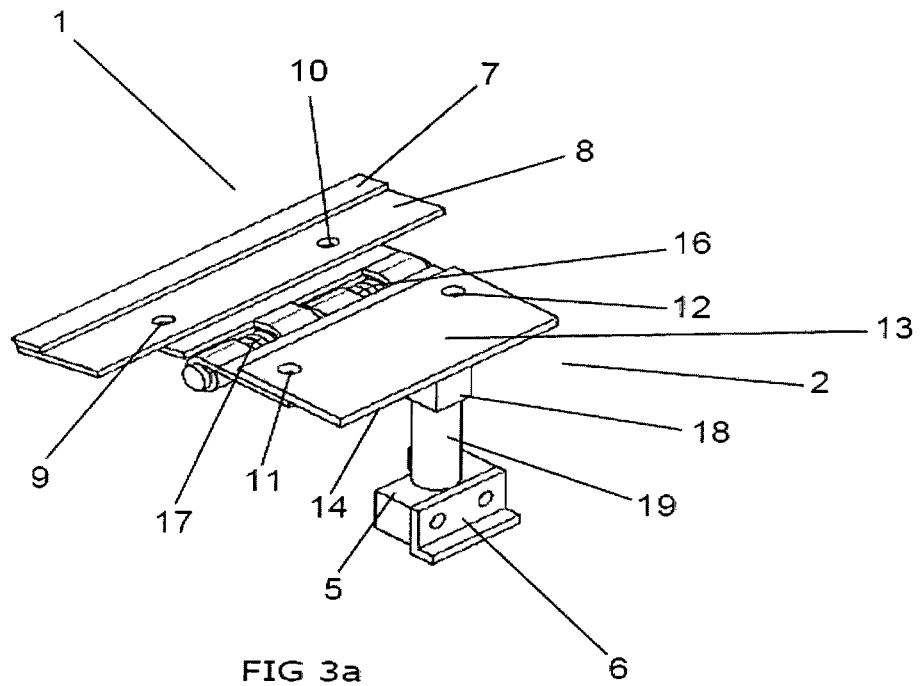
FIGS. 3a and 3b are the isometric view and the side view of one blade tip assembly and one hinge assembly of a belt scraper assembly in assembled condition.
Figure 5:
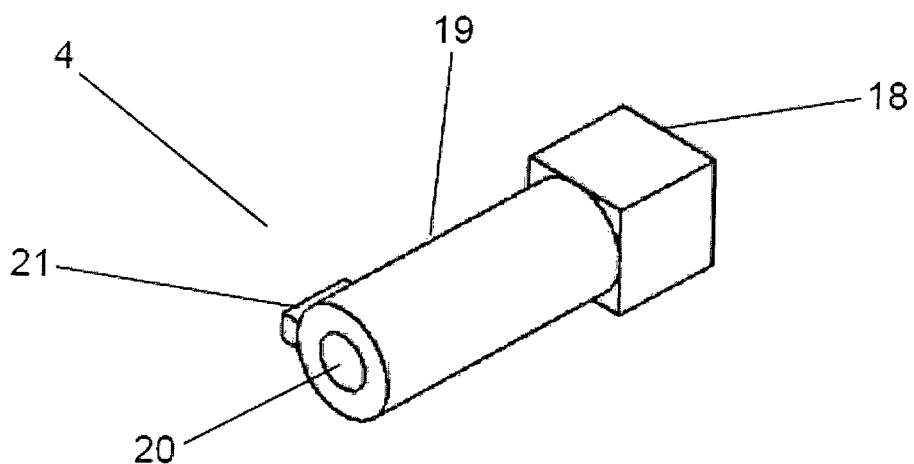

The arrangements will be further clear from FIG. 3a which is an isometric view of a blade assembly pair comprising of one blade tip assembly (1) and one hinge assembly (2) of a belt scraper assembly, in assembled condition. As shown in this figure the portion (4) consists of the cubical portion (18) and a cylindrical portion (19) with tapped hole (20). This portion (4) is elaborately shown in FIG. 5. There is also a key (21) in portion (4) which is important to give limited rotational motion to the blade tip assembly (1). This motion is important to adjust the blade tip on varying surface profile.

The plate (14) shown in FIG. 2a is connected along its basal surface to the top portion of the cubical portion (18) of portion (4), by welding along the respective flat portions. This should be clear from FIG. 3a.

Figure 3B:
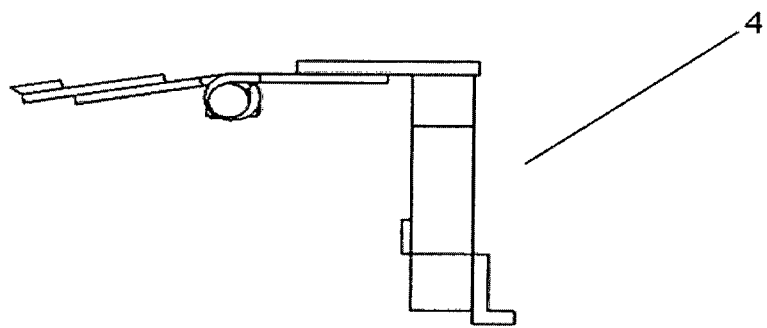

FIG. 3b side view of the embodiment shown in FIG. 3a.

Figure 4A:
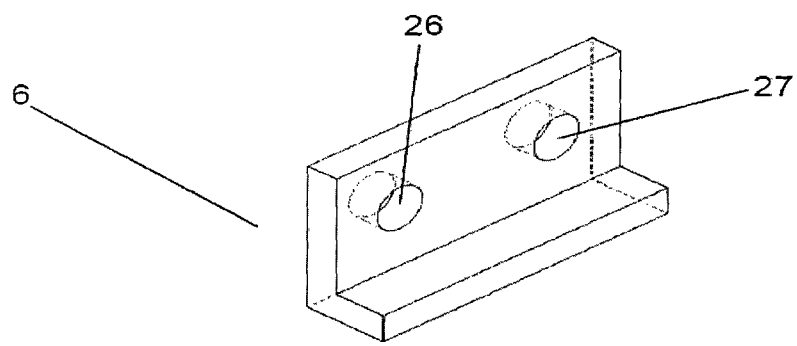
Figure 4B:
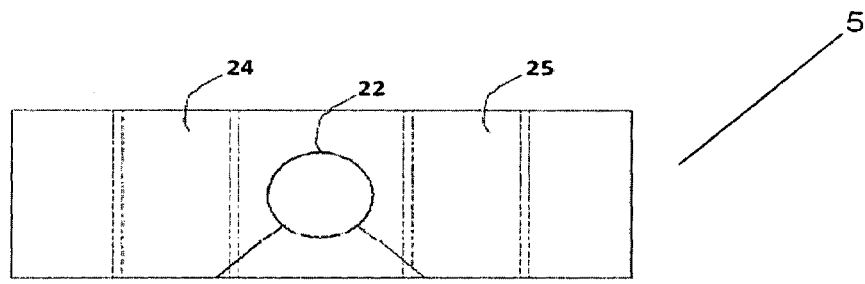
Figure 4C:
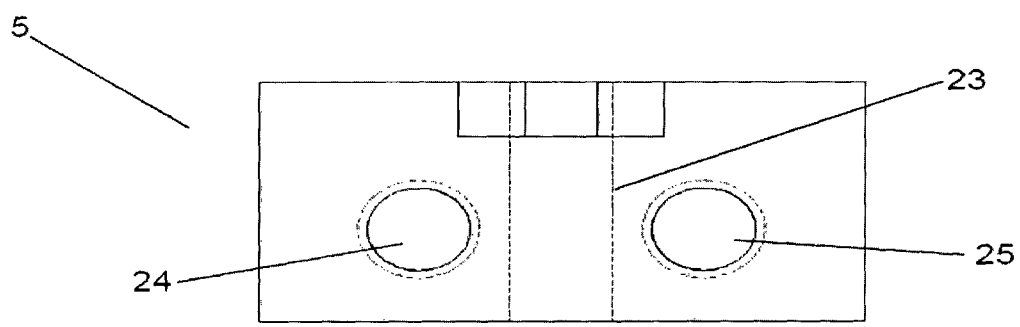

FIG. 4a is isometric view of plate member (6) shown in FIGS. 1a, 1b and 1c. FIGS. 4b and 4c are the top view and front view respectively of the locking unit (5) shown in FIGS. 1a, 1b and 1c.

The locking unit (5) has a hole (22) in its top surface as shown in FIG. 4b.

Again referring back to FIG. 3a, it would be clear that the cylindrical portion (19) is attached to the locking unit (5) along its base, by bolting through the tapped hole (20) and through the hole (22), on the top surface of the locking unit (5).

As shown in FIG. 4c the locking unit (5) has a locking portion (23) which locks a key (21 best shown in FIG. 5) along the hole (22) to provide limited motion to the blade tip assembly (1). This figure also shows holes (24,25) existing in the front wall of the locking unit (5).

FIG. 4a shows the plate member (6) having holes (26,27) in the corresponding end wall of the plate member (6).

The locking unit (5) is connected along its front wall to the plate member (6) by bolting through holes (24,25) in the front wall of the locking unit (5) and through corresponding holes (26,27) in the corresponding end wall of the plate member (6). This connection should be clear from FIG. 3a.

The plate member (6) is connected to the chain (3) as shown in FIG. 1c. It is given tension using two coil springs connected at both the ends of the scraper assembly.

From the foregoing description and the appended claims it should be clear that all the desired objectives of the present invention are fulfilled.

The present invention has been described with reference to some drawings and preferred embodiments, purely for the sake of understanding and not by way of any limitation and the present invention includes all legitimate developments within the scope of what has been described hereinbefore and claimed in the appended claims.

The invention claimed is:

1. An improved belt scraper assembly for belt conveyors comprising:
    at least a first and a second blade assembly; and
    at least a hinge assembly mounted on either side of a supporting flexible member for facilitating twin blade cleaning,
    wherein said first and second blade assemblies being operatively connected to said hinge assembly which is adapted to ensure limited rotational motion of said first and second blade assemblies,
    wherein said hinge assembly comprises two mild steel plates connected by a pin, said plates being provided with drilled holes on its surface.

2. The improved belt scraper assembly as recited in claim 1, wherein said blade assembly having a blade tip assembly directly contacted with a belt surface, said blade tip assembly comprising a tungsten carbide flexible tip brazed on a plate of mild steel adapted for cleaning a belt but bending upon encountering a mechanical fastener or similar fastener, said plate having drilled holes on its surface and said flexible member including a chain or a wire.

3. The improved belt scraper assembly as recited in claim 2, wherein said blade tip assembly is attached to said steel plate by bolting in said drilled holes.

4. The improved belt scraper assembly as recited in claim 1, wherein said hinge assembly is provided with torsion springs for providing flipping motion to said blade assembly said mild steel plates of said hinge assembly having a different length than the length of an adjacent blade, so that said flexible member forms a curve.

5. The improved belt scraper assembly as recited in claim 1, wherein said steel plate of said hinge assembly is connected to a portion along its base, said portion being of adjustable dimension and having a cubical portion (18) and a cylindrical portion with a tapped hole.

6. The improved belt scraper scrapper assembly as recited in claim 5, wherein said steel plate is connected to said cubical portion by bolting respective flat portions of said steel plate and said cubical portion.

7. The improved belt scraper scrapper assembly as recited in claim 5, wherein said cylindrical portion is attached to a locking unit along its base, by bolting through said tapped hole and through a hole in the top surface of said locking unit.

8. The improved belt scraper assembly as recited in claims 7, wherein said locking unit has a locking portion which locks a key along said hole to provide limited motion to said blade tip assembly.

9. The improved belt scraper assembly as recited in claim 8, wherein said locking unit is connected along its front wall to a plate member by bolting through holes in said front wall of said locking unit and through corresponding holes in the corresponding end wall of said plate member, said plate member being connected to said flexible member.

10. A belt scraper assembly for a belt conveyor, comprising:
- a flexible chain; and
- a first and a second blade holder assembly, said first blade holder assembly coupled to a first side of said flexible chain and said second blade holder assembly coupled to a second side of said, flexible chain, said first blade assembly and said second blade assembly each including:
  - a blade assembly, and
  - a hinge assembly, said hinge assembly operatively coupled between said blade assembly and said flexible chain, said hinge assembly adapted to allow said blade assembly to pivot a limited amount relative to said flexible chain.

* * * * *